United States Patent [19]

Hatch et al.

[11] Patent Number: 4,943,068
[45] Date of Patent: Jul. 24, 1990

[54] UNITIZED EXCLUSION SEAL

[75] Inventors: Frederick R. Hatch, Ann Arbor; William M. Riley, Milan; Thomas M. Banks, Ypsilanti, all of Mich.

[73] Assignee: Mather Seal Company, Milan, Mich.

[21] Appl. No.: 378,442

[22] Filed: Jul. 10, 1989

Related U.S. Application Data

[63] Continuation of Ser. No. 75,170, Jul. 20, 1987, abandoned.

[51] Int. Cl.⁵ .................... F16J 15/32; F16J 15/34; F16J 15/44; F16J 15/54
[52] U.S. Cl. .......................... 277/23; 277/38; 277/47; 277/53; 277/56; 277/58; 277/65; 277/95; 277/134; 277/152; 277/153
[58] Field of Search .............. 277/53, 56, 58, 65, 277/152, 153, 134, 47; 384/473, 480, 484, 482

[56] References Cited

U.S. PATENT DOCUMENTS

| 2,073,768 | 3/1937 | Victor et al. | 277/45 X |
| 2,919,148 | 12/1959 | Smith | 277/231 |
| 3,206,216 | 9/1965 | Crook | 277/23 |
| 3,601,412 | 8/1971 | Malmstrom | 277/94 |
| 3,606,351 | 9/1971 | Hallerback | 277/25 |
| 4,049,281 | 9/1977 | Bainard | 277/38 X |
| 4,106,781 | 8/1978 | Benjamin et al. | |
| 4,208,058 | 6/1980 | Wanner et al. | 277/153 |
| 4,440,401 | 4/1984 | Olschewski et al. | 277/50 |
| 4,448,426 | 5/1984 | Jackowski et al. | 277/37 |
| 4,555,188 | 11/1985 | Neal | 384/482 |
| 4,674,755 | 6/1987 | Colanzi et al. | 277/23 |

FOREIGN PATENT DOCUMENTS

013650A2 10/1983 Fed. Rep. of Germany.

Primary Examiner—Allan N. Shoap
Attorney, Agent, or Firm—Lawrence J. Shurupoff

[57] ABSTRACT

A static dirt exclusion element is arranged in a unitized housing to contact a rotating exclusion element so as to provide a primary barrier to dust and airborne contaminants. A secondary barrier is provided in the housing in the form of a porous filter element formed of a foam or felted material to further exclude and entrap contaminants.

3 Claims, 3 Drawing Sheets

UNITIZED EXCLUSION SEAL

This is continuation of application Ser. No. 075,170, filed July 20, 1987, now abandoned.

BACKGROUND OF THE INVENTION

2. Field of the Invention

This invention relates generally to shaft seals and more particularly relates to a debris-excluding shaft seal with an extended life expectancy achieved through minimization of frictional contact between rotating sealing surfaces and through entrapment of abrasive contaminants within a porous filter element.

2. Description of Prior Developments

Prior debris-excluding seals have traditionally experienced various operational problems including the generation of excessive heat via frictional contact between rotating seal elements. This frictional heat is primarily caused by the relatively high contact forces extisting between the rotating seal elements. While these high contact forces were believed necessary to effect a reliable seal, they have been shown to cause rapid wear between the rotating sealing surfaces and have significantly reduced seal life.

One approach to overcome this heating problem is to avoid contact between the rotating elements by providing a small clearance therebetween. However, this approach presents another problem wherein debris passes through, or is entrapped within the clearance space. This condition results in extremely rapid abrasive wear of the sealing elements as well as wear of the rotating shaft.

It has generally been assumed that by providing a plurality of engagement points between rotating seal elements so as to form a plurality or series of sealing surfaces, a more effective barrier to debris would result. Thus, known debris excluding seals generally provide several points of contact between the rotating seal elements to form a series of sealing surfaces. However, each contact point acts as a source of frictional heat, which as noted above, adversely affects seal life.

A particularly difficult sealing problem arises in those applications where dirt excluding seals must accommodate significant shaft runout and/or shaft-to-bore misalignment. Prior seals have not proven effective in these cases and have not been well accepted by industry.

Another inconvenience associated with existing dirt excluding seals is the difficulty of properly and accurately aligning the stationary seal element with respect to the rotating seal element during installation of the seal assembly about a shaft.

In those instances where a seal is provided with hydrodynamic features, an additional problem often arises. While the hydrodynamic pumping effect serves to prevent lubricant from passing beyond the seal lip, a vacuum is generated which tends to draw or suck air beneath the lip from the surrounding environment on the dry or air side of the seal. If the air contains any contaminants such as dust particles, the contaminants are also drawn under the seal lip. This not only accelerates lip wear and reduces seal life but it also results in contaminanted lubricant and/or wear of internal moving parts.

When a seal produces a hydrodynamic action a surprisingly large pressure differential is developed across the seal lip. As noted, a vacuum effect is created on the air or dry side of the seal while ambient pressure is present within the wet or inner side of the seal. This condition can result in large contact forces between the lip and shaft if an air tight seal is formed therebetweem. This contact force can be reduced by allowing a small amount of air to be drawn past the seal lip so as to minimize the pressure differential. However, by drawing air beneath the seal lip, the problem of contamination arises.

Moreover, large contact forces such as described above generate excessive frictional heat. In some instances this heat between the shaft and lip becomes so great that the lubricant which flows against and beneath the lip breaks down and becomes corbonized. This carbonized lubricant then bonds to the lip and/or shaft and forms a deposit of build-up of hardened carbon. This build -up then prevents continuous contact between the lip and shaft and results in seal leakage.

Accordingly, a need exists for a unitized dirt-excluding shaft seal which minmizes the generation of frictional heat by reducing the contact force between rotating sealing surfaces thereby extending seal life and protecting shaft finish.

A need also exists for a seal which prevents contaminants such as dust particles from passing beneath a seal lip, particularly in those cases where the seal is generating a hydrodynamic effect, yet which avoids large contact forces between the seal lip and the shaft.

SUMMARY OF THE INVENTION

The present invention has been designed to fulfill the needs noted above and therefore has as a primary object the provision of a unitized dirt-excluding shaft seal having extended life expectancy and improved performance, particularly in those applications where extremely dusty and dirty operating conditions prevail. Typical applications include front crankshaft seals for off-road engines as well as drive shaft and axle seals for earth moving machinery.

Another object is to provide a dirt-excluding shaft seal which minimizes the contact forces between rotating seal elements so as to minimize the production of frictional heat and correspodingly reduce the frag force of the seal on the shaft.

Still another object is to provide a dirt-excluding shaft seal which employs a single line of contact between a stationary seal case and a rotating seal lip so as to further reduce frictional heat.

Another object is to prevent airborne particles from contacting a seal lip and to prevent such particles from being drawn under the lip, particularly in those cases where the particles are drawn toward the lip by a vacuum created by hydrodynamic effects.

Yet another object of the present invention is to facilitate the handling, installation and alignment of a dirt excluding shaft seal about a shaft.

Another object is to provide a dirt-excluding seal which effectively accommodates significant amounts of shaft runout as well as singnificant misalignment between the seal bore housing and the shaft.

The present invention is generally directed to a unitized dirt-excluding seal which includes a static exclusion element arranged in limited contact with a rotating exclusion element. The rotating element is pressed or bonded to a shaft so as to rotate with the shaft. These coacting sealing elements provide an initial or primary barrier to exclude contaminants such as dust and abrasive particles from the interior of the seal. The contaminants are thus prevented from passing from the environment surrounding the seal to an interior region within the seal, wherein lubricant or bearing surfaces are located.

A secondary barrier may be incorporated with the seal to further prevent the passage of contaminants therethrough. The secondary barrier may take the form of a foam or felted filter that contacts or nearly contacts an interior portion of the rotating element. Additional sealing lips may be provided on the interior of the primary and/or secondary barrier to serve as conventional lubricant seals. These conventional seal elements may allow small amounts of ambient air to pass beyond the seal lips so as to prevent excessive loading between the lip and shaft yet without allowing passage of contaminants past the lip. This is possible because of the presence of the filter which traps the airborne contaminants before they contact the seal lip so that only clean filtered air reaches the interior seal lip.

Various other objects, features and attendent advantages of the present invention will be more fully appreciated from the following detailed description when considered in connection with the accompanying drawings, in which the same reference numbers designate the same or corresponding parts throughout.

DETAILED DESCRIPTION OF THE PREFERRED EMBODIMENTS

Figure 1:
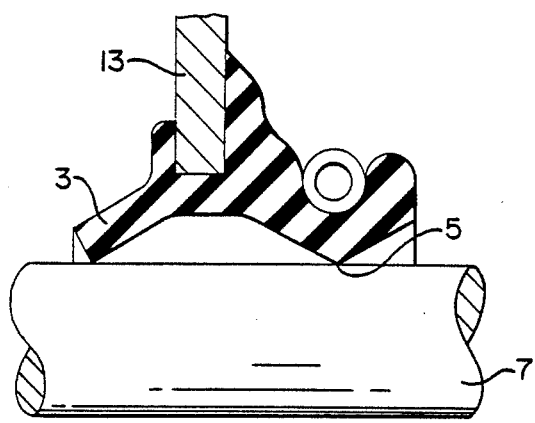
FIG. 1 is a fragmental axial sectional view of a conventional rotary shaft lip seal provided with a debris exclusion lip of known design.

As seen in FIG. 1, a conventional one-piece dirt excluding shaft seal (1) includes a dirt exclusion lip (3) and an oil sealing lip (5) each engaging a rotating shaft (7). This traditional design depends on dynamic intereference between the lips and shaft to maintain an adequate seal. The exclusion lip (3) is intended to run on an oil film which tends to attract dust particles from the air. When the oil and dust particles mix, an abrasive slurry is formed which accelerates seal wear and leads seal failure.

In use, heat is generated by friction between the seal lips (3), (5) and the shaft. The frictional heat produced by the exclusion lip (3) is transferred along the shaft and raises the shaft temperature to a value above that which would result from the sole use of the oil sealing lip (5) in the absence of dirt exclusion lip (3). Moreover, frictional heat generated by the oil sealing lip is transferred to the shaft and raises shaft temperature adjacent the exclusion lip as well. This increased shaft temperature adversely affects the life of each lip and correspondingly reduces the effective life of the seal. Heat from the frictional contact with the shaft causes the elastomeric or polymeric lip material to become hard and brittle and eventually chip and break, thereby causing a leak.

Figure 2:
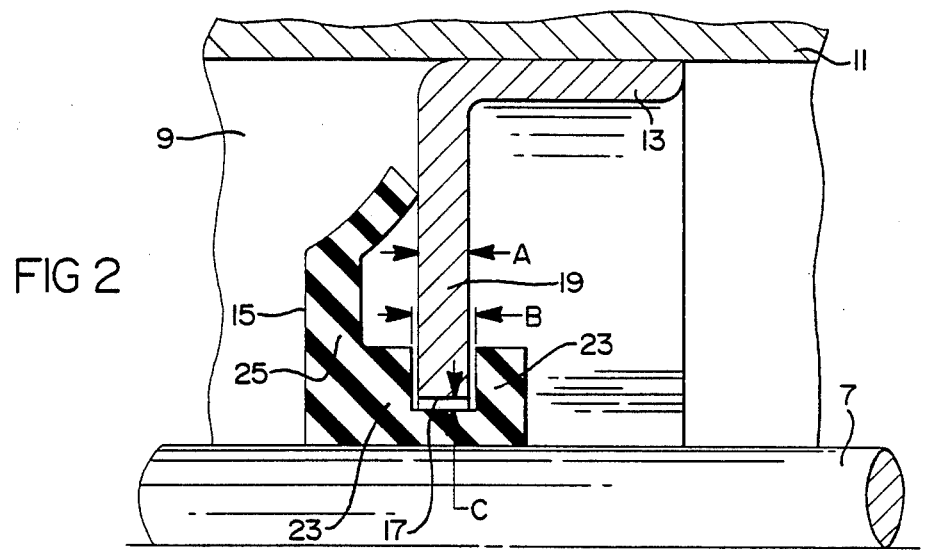
FIG. 2 is a fragmental axial sectional view of a unitized exclusion lip seal according to the invention.

As seen in FIG. 2, a basic embodiment of the present invention is directed to a two-piece unitized shaft seal (9) which is mounted over shaft (7) and press fit within the bore of a seal housing (11). The unitized seal includes an annular case member (13) and an annular shaft engaging member (15). Typically, the shaft engaging member is pressed onto or bonded to the shaft and rotates with the shaft, while the case member remains static within the metallic housing or bore (11).

Member (15) may be formed of any non-metallic engineering material such as an elastomeric or thermoplastic material. Preferred materials include carboxylated nitrile and materials which are highly resistant to abrasion, can withstand high operating temperatures, are easily molded and have good resistance to chemical attack. The case member (13) is preferably formed of a metallic material for efficiently conducting heat from member (15) towards housing (11) where it is dissipated without raising the temperature of the shaft.

Member (15) is provided with an annular unitizing channel (17) which not only prevents disengagement of members (13) and (15) prior to installation but also aids in the installataion of the unitized seal. That is, channel (17) serves to axially align the shaft engaging member (15) with respects to the radial flange (19) of the case member. The radial inner extremity (20) of the flange is properly and automatically disposed between the mutually confronting radially extending walls (21) of the channel upon installation. Little, if any additional adjustment is required once the unitized seal is seated within its housing.

An important feature of the unitized seal is the relative axial widths of the channel (17) and the flange (19). In order to minimize or prevent unwanted contact between the internal walls (21) of the channel and the surfaces of the flange, the width A of the flange should be less than the width B of the channel. Moreover, a clearance C should be maintained between the radial innermost end face of the flange and the floor of the channel to prevent contact therebetween in the event of excessive radial shaft runout and/or excessive radial shaft whip.

In order to prevent disassembly of the shaft engaging member (15) from the case member (13), channel (17) is bounded by annular radial ridges or projections (23). These projections, while preferably formed of a resilient material, are radially short and axially thick to resist axial deflection upon contact with the radial inner extremity of flange (19). Such contact may occur during handling and installation of the seal, but once the seal is correctly installed, this contact is avoided or minimized by the dimensioning noted above.

The shaft engaging member (15) is further provided with a radially outwardly projecting lip element (25). As seen as FIG. 3, the lip element may be formed with a relatively thin and resilient end portion (27). The tip (29) of the end portion is axially extended toward and over channel (17) to an extent which ensures a proper contact pressure range between the tip and an outer surface portion of the flange. This contact pressure should range from approximately 0.5 oz. to 25.0 oz. for most practical applications.

Figure 3:
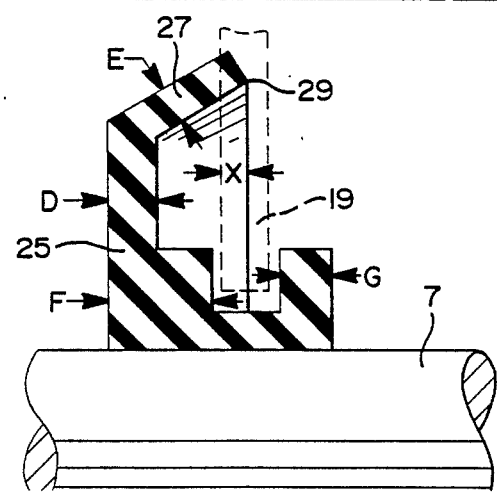
FIG. 3 is a fragmental sectional view of the shaft engaging portion of the unitized exclusion seal of FIG. 2 showing the proper positioning of the case flange in phantom.

An additioal advantage is gained by this dimensioning of the flange, channel and tip. By ensuring a biased interference fit between tip (29) and flange (19) over an axial extent X as shown in FIG. 3, axial end play of shaft (7) will not result in a loss of contact between the tip (29) and flange (19) within a tolerance of X. The degree of interference X may be varied depending upon the acceptable limits of contact force and shaft end play.

In the event of shaft runout or shaft whip, contact will be maintained between tip (29) and flange (19) since relative radial movement between these seal members does not affect the axially directed sealing contact force therebetween. This is not the case, however, for conventional seals such as shown in FIG. 1 which rely upon radial sealing forces. The axial widths D and E of the lip element (25) and the end portion (27), respectively, should be generally less than the thicknesses F, G of either of the radial projections (23) so that the specified light contact pressure range is maintained between the tip (29) and the flange (19).

A definite advantage is gained by providing a single circumferential line or band of continuous contact between tip (29) and flange (19) in that the frictional heat generated along this annular contact line is limited to a single source and location and is thus adequately controlled and significantly reduced. Little if any heat is transferred from this contact area to the shaft. Moreover, this contact needs no lubricant so that attraction and accumulation of airborne particulate contaminants by oil or the like is avoided.

Installation of the unitized seal is simplified by its design. The seal is simply pressed axially into housing (11) in a conventional manner after the shaft engaging member has been radially stretched over the shaft. The radial prejections (23) of the shaft engaging member prevent its disengagement from the case member during installation due to the relatively stiff resistance to deflection provided by the short height and wide axial width of the projections. Once seated within housing bore (11), either the case or the shaft engaging member may be axially shifted if desired, to attain single point contact therebetween at tip (29). Thus, the radially inner end portion or exterrmity 20 of shaft (19) may be aligned without contact within channel (17) during use.

Figure 4:
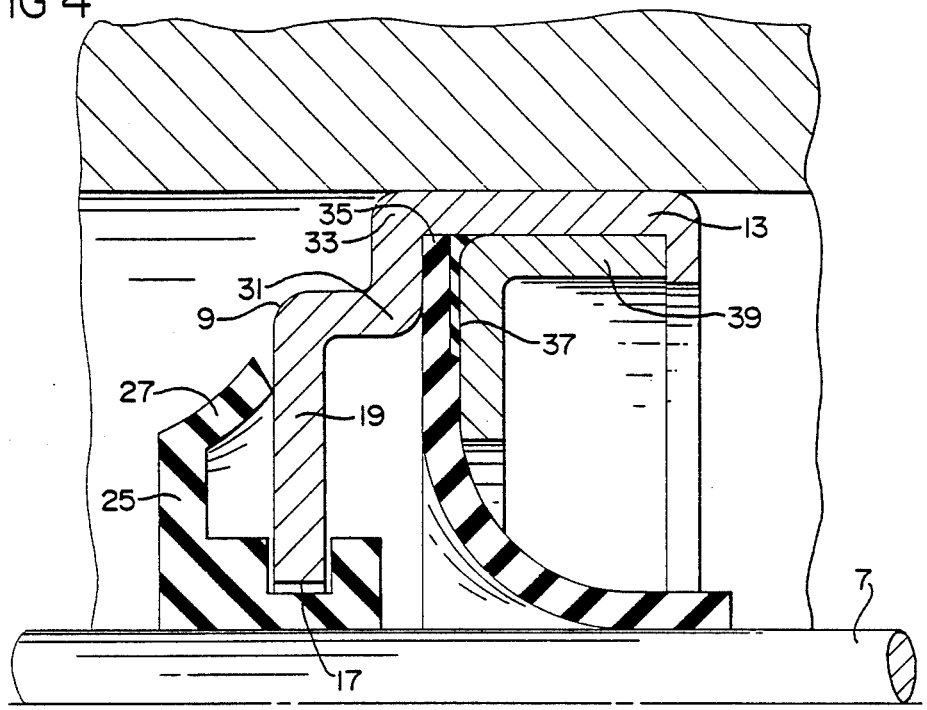
FIG. 4 is a fragmental sectional view of an alternate embodiment of the unitized exclusion seal combined with a polytetrafluoroethylene radial lip seal.

Another embodiment of the invention is shown in FIG. 4 wherein case member (13) is radially and axially stepped at (31) to provide an annular mounting ridge (33) against which a polytetrafluoroethylene (PTEF) lip element (35) is clamped in a known fashion. A sealing gasket (37) is provided between the lip element and the clamping member (39) to prevent leakage in a conventional gasket arrangement.

Figure 5:
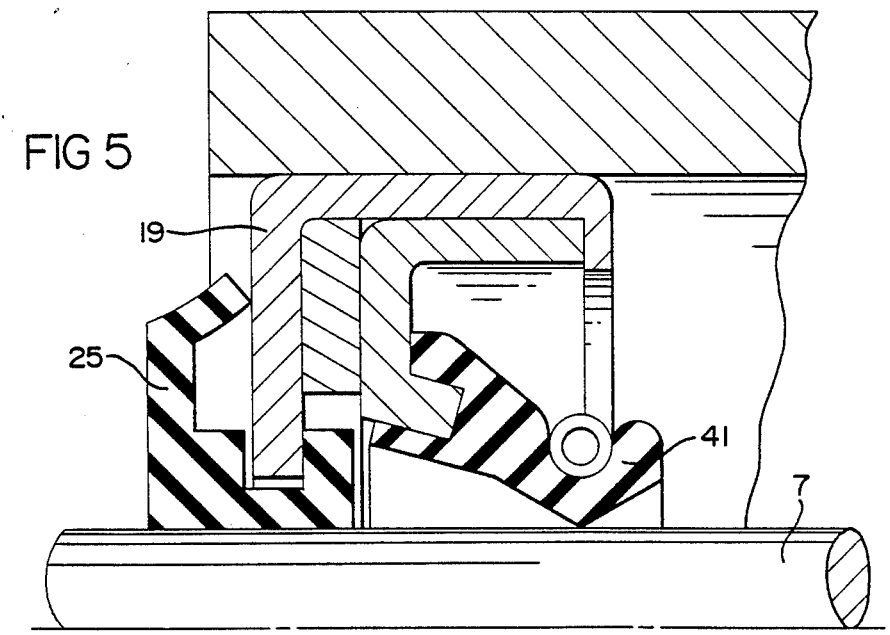
FIG. 5 is a fragmental sectional view of yet another embodiment of the unitized exclusion seal combined with a conventional elastomeric radial lip seal.

FIG. 5 depicts another embodiment wherein an elastomeric seal lip (41) is bonded to the case member in a common configuration. In both FIGS. 4 and 5, it can be appreciated that the frictional heat developed by the dirt exclusion portion of the seal is limited to the flange (19). This heat is transferred from the metal flange to the seal housing (11) where it is dissipated without adversely affecting either seal lip element (35) or (41).

Since most elastomers and thermoplastic resist heat transfer, little if any heat is transferred through lip element (25) of the shaft engaging member to the shaft. This significantly enhances the life of the seals and protects the shafts. Moreover, the light contact pressure between the contelevered tip (29) of lip element (25) and the flange (19) even further reduces frictional heating of the seals.

Figure 6:
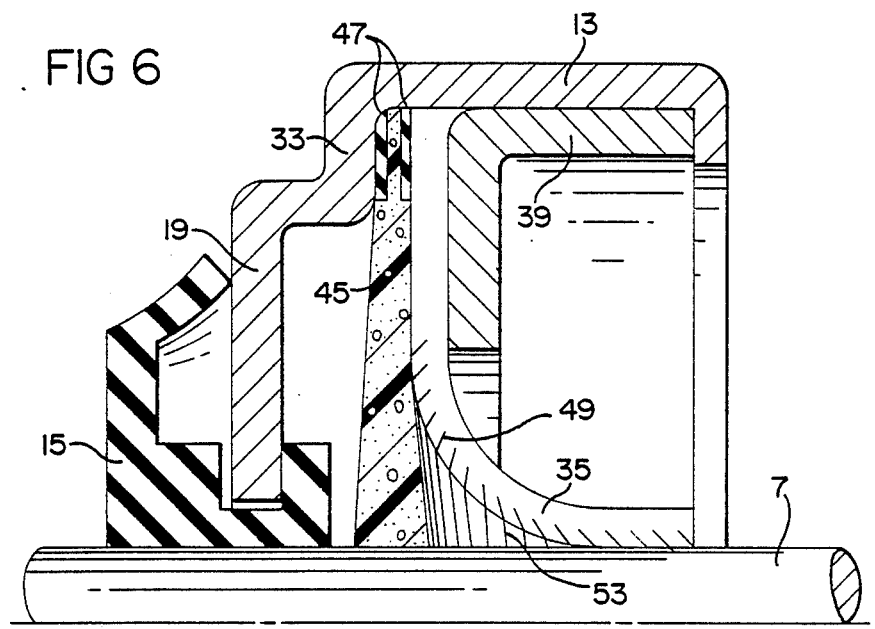
FIG. 6 is a fragmental sectional view of still another embodiment of the unitized exclusion seal provided with a secondary filter to absorb airborne contaminants.

A further refinement of the invention is shown in FIG. 6. Although the seal shown in FIG. 6 appears similar to that shown in FIG. 4, a significant improvement is incorporated in the desigh of FIG. 6. While this embodiment includes a primary dust excluding portion composed of annular shaft engaging member (15) and flange (19) as described above, a secondary porous annular filter element (45) is clamped between step (33) of metal case (13) and lip element (35) with the inner case or clamping member (39). One or more gaskets (47) may be clamped between the filter and case and/or between the filter and lip element. The gaskets, preferably rubber washers, prevent lubricant from passing between the radial outermost tip of the lip (35) and casing (13). This in turn prevents the lubricant from wicking through the foam filter element and reducing its effectiveness.

As a secondary barrier to dust and other particulate contaminants, the filter (45) is arranged to be in contact with the rotating shaft engaging member (15) or at least in near contact therewith. Filter (45) is preferably formed of a felted polyurethane foam since polyurethane foam has excellent resistance to abrasion an ensures a long operational life. The mesh or pore size of the foam is preferably within the range of 1 to 500 microns.

As further seen in FIG. 6, lip element (35) is provided with spiral grooves or slits (49) for generating a hydrodynamic pumping action which tends to pump lubricant inwardly in the direction of arrow (51). This pumping action tends to create a vacuum around the outer side of the lip as at (53). This vacuum in turn tends to draw in particulate airborne contaminants past the dirt and dust excluding elements 15 and 19.

By arranging filter (45) between the dust excluding elements 15 and 19 and the lip element (35), all particulate matter drawn past the first contaminant excluding barrier (15,19) is embedded within the pores of the filter (45) and is prevented from reaching the lubricant sealing lip (35). This significantly increases seal life and allows contact forces between lip element (35) and shaft (7) to be reduced.

That is, in order to prevent contaminants from being drawn past lip element (35), prior designs have maintained large contact forces between the lip and shaft so as to form an air-tight seal. This approach often failed because at high rotative speeds the lip was unable to maintain contact with the shaft and contaminants would thus gain entry to the luburicant side of the seal. Furthermore, the high contact forces augmented by the hydrodynamically induced pressure differential carbonized the lubricant as discussed above.

The seal shown in FIG. 6 need not and preferably does not maintain an air-tight seal but rather maintains a light contact to allow a small amount of filtered air to flow past lip element (35). This air flow tends to neutralize any hydordynamically induced pressure differential and thereby prevents excessive lip-to shaft contact forces.

Figure 7:
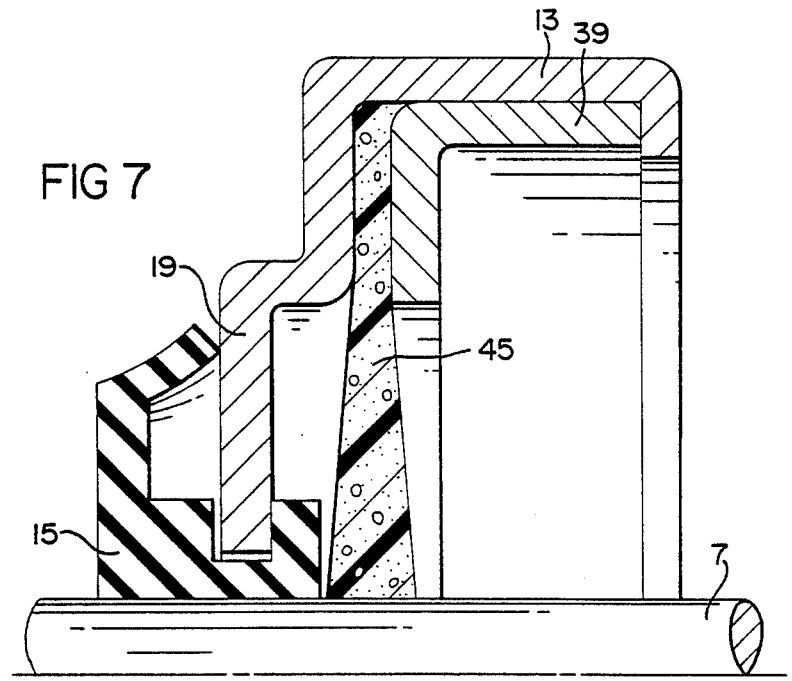
FIG. 7 is a fragmental sectional view of still another embodiment of the unitized exclusion seal provided with a secondary filter to absorb airborne contaminants.

As shown in FIG. 7, the two-stage seal may be used without the lip seal (35) so as to serve only as a dust guard. Morever, the filter (45) may be used with any of the embodiments shown in FIGS. 2, 4 or 5 as well. It is also possible to bond the filter (45) to the rotating elements (15) instead of clamping or bonding the filter to the metal case (13).

Obviously, numerous modifications and variations of the present invention are possible in light of the above teachings. It is therefore to be understood that within the scope of the appended claims, the invention may be practiced otherwise than as specifically described herein.

What we claim is:

1. A unitized seal for excluding debris from a portion of a rotating shaft, comprising:

an annular shaft-engaging member having an annular unitizing channel with a predetermined width formed therein, said channel bounded by radially outwardly extending annular projections having mutully confronting wall surfaces extending radially outwardly from said shaft-engaging member, said annular prejections having stiff axially extending sections to resist axial deflection and prevent disassembly of said unitized seal during installation of said unitized seal over said shaft;

a single lip element projecting radially outwardly from shaft-engaging member, said lip element formed with an annular tip portion having an axial section thinner than said axially-extending sections of said annular projections;

a metallic seal case member for efficiently conducting heat from said lip element to a seal housing, said seal case member comprising a radially inwardly projecting flange having a radial inner extremity formed with a width less than said predetermined width, said flange positioned within said channel with a clearance fit and having an exterior radially extending surface portion in contact with said lip element along a single contact band; and a seal lip element mounted to said seal case member for sealing lubricant between said seal lip element of said case member and said rotating shaft and extending radially inwardly from said cast member for engagement with a portion of the shaft.

2. A unitized seal for excluding debris from a portion of a rotating shaft, comprising:

an annular shaft-engaging member having an annular unitizing channel with a predetermined width formed therein, said channel bounded by radially outwardly extending annular projections having mutully confronting wall surfaces extending radially outwardly from said shaft-engaging member, said annular projections having stiff axially extending sections to resist axial deflection and prevent disassembly of said unitized seal during installation of said unitized seal over said shaft;

a single lip element projecting radially ourwardly from said shaft-engaging member, said lip element formed with an annular tip portion having an axial section thinner than said axially-extending sections of said annular projections;

a metallic seal case member for efficiently conducting heat from said lip element to a seal housing, said seal case member comprising a radially inwardly projecting flange having a radial inner extremity formed with a width less than said predetermined width, said flange positioned within said channel with a clearance fit and having an exterior radially extending surface portion in contact with said lip element along a single contact band; and filter means disposed adjacent said shaft engaging member and within said case member for entrapping contaminants within said filter means and extending radially inwardly from said case member for engagement with a portion of the shaft.

3. A unitized seal for excluding debris from a portion of a rotating shaft, comprising:

an annular shaft-engaging member having an annular unitizing channel with a predetermined width formed therein, said channel bounded by radially outwardly extending annular projections having mutully confronting wall surfaces extending radially outwardly from said shaft-engaging member, said annular projections having stiff axially extending sections to resist axial deflection and prevent disassembly of said unitized seal during installation of said unitized seal over said shaft;

a single lip element projecting radially outwardly from said shaft-engaging member, said lip element formed with an annular tip portion having an axial section thinner than said axially-extending sections of said annular projections;

a metallic seal case member for efficiently conducting heat from said lip element to seal housing, said seal case member comprising a radially inwardly projecting flange having a radial inner extremity formed with a width less than said predetermined width, said flange positioned within said channel with a clearance fit and having an exterior radially extending surface portion in contact with said lip element along a single contact band; and a seal lip element mounted to said case member for sealing lubricant between said seal lip element and said rotating shaft, and filter means axially disposed between said shaft engaging member and said seal lip for entrapping contaminants within said filter means.

* * * * *

UNITED STATES PATENT AND TRADEMARK OFFICE
CERTIFICATE OF CORRECTION

PATENT NO. : 4,943,068
DATED : July 24, 1990
INVENTOR(S) : Frederick R. Hatch, William M. Riley and Thomas M. Banks It is certified that error appears in the above-identified patent and that said Letters Patent is hereby corrected as shown below:

Column 2, line 2, "between" should read -- therebetween --.

Column 2, line 12, "corbonized" should read -- carbonized --.

Column 2, line 14, "of" (first occurrence) should read -- or --.

Column 2, line 15, "build -up" should read -- build-up --.

Column 2, line 18, "minmizes" should read -- minimizes --.

Column 2, line 41, "correspodingly" should read -- correspondingly --.

Column 2, line 41, "frag" should read -- drag --.

Column 2, line 57, "singnificant" should read -- significant --.

Column 3, line 12, "lips" should read -- lip --.

Column 3, line 59, after "leads" insert thereat -- to --.

Column 4, line 31, "respects" should read -- respect --.

Column 5, line 1, "additioal" should read -- additional --.

Column 5, line 35, "prejections" should read -- projections --.

Column 5, line 43, "extermity" should read -- extremity --.

Column 5, line 48, "(PTEP)" should read -- (PTFE) --.

Column 5, line 61, "thermoplastic" should read -- thermoplastics --.

Column 5, line 66, "contelevered" should read -- cantelevered --.

Column 6, line 4, "desigh" should read -- design --.

Column 6, line 49, "luburicant" should read -- lubricant --.

Column 6, line 57, "hydordynamically" should read -- hydrodynamically --.

UNITED STATES PATENT AND TRADEMARK OFFICE
CERTIFICATE OF CORRECTION

PATENT NO. : 4,943,068

DATED : July 24, 1990

INVENTOR(S) : Frederick R. Hatch, William M. Riley and Thomas M. Banks

It is certified that error appears in the above-identified patent and that said Letters Patent is hereby corrected as shown below:

Column 6, line 58, "lip-to shaft" should read -- lip-to-shaft --.

Column 6, line 62, "Morever" should read -- Moreover --.

Column 6, line 65, "ments" should read -- ment --.

Column 7, line 14, "prejections" should read -- projections --.

Column 7, line 19, after "from" insert thereat -- said --.

Column 7, line 35, "cast" should read -- case --.

Column 7, line 49, "ourwardly" should read -- outwardly --.

Column 8, line 15, after "means" delete "and extending radially inwardly from said case member for engagement with a portion of the shaft" and insert thereat -- in a defined radial space between the case member and the shaft --.

Signed and Sealed this

Twenty-first Day of April, 1992

Attest:

HARRY F. MANBECK, JR.

*Attesting Officer*       *Commissioner of Patents and Trademarks*